United States Patent
Cook et al.

(10) Patent No.: US 8,581,542 B2
(45) Date of Patent: Nov. 12, 2013

(54) RECEIVE ANTENNA ARRANGEMENT FOR WIRELESS POWER

(75) Inventors: Nigel P. Cook, El Cajon, CA (US); Lukas Sieber, Olten (CH); Hanspeter Widmer, Wohlenschwil (CH)

(73) Assignee: QUALCOMM Incorporated, San Diego, CA (US)

( * ) Notice: Subject to any disclaimer, the term of this patent is extended or adjusted under 35 U.S.C. 154(b) by 154 days.

(21) Appl. No.: 12/554,478

(22) Filed: Sep. 4, 2009

(65) Prior Publication Data

US 2010/0210233 A1    Aug. 19, 2010

Related U.S. Application Data

(60) Provisional application No. 61/095,264, filed on Sep. 8, 2008.

(51) Int. Cl.
*H02J 7/00* (2006.01)
*H02J 7/16* (2006.01)
*H01F 27/42* (2006.01)
*H01F 5/00* (2006.01)
*H04B 7/00* (2006.01)

(52) U.S. Cl.
USPC ........... 320/108; 320/107; 320/104; 320/136; 307/104; 455/274; 336/200

(58) Field of Classification Search
USPC ......... 320/107, 108, 109, 110, 111, 112, 113, 320/114, 115, 116; 455/269, 270, 271, 274; 336/84 R, 84 C, 84 M
See application file for complete search history.

(56) References Cited

U.S. PATENT DOCUMENTS

| | | | |
|---|---|---|---|
| 6,008,622 A | 12/1999 | Nakawatase | |
| 7,576,514 B2 * | 8/2009 | Hui | 320/108 |
| 7,791,312 B2 * | 9/2010 | Kook | 320/108 |
| 2007/0252771 A1 * | 11/2007 | Maezawa et al. | 343/841 |
| 2007/0278998 A1 * | 12/2007 | Koyama | 320/109 |
| 2008/0111518 A1 * | 5/2008 | Toya | 320/108 |
| 2008/0224655 A1 * | 9/2008 | Tilley et al. | 320/108 |
| 2009/0096413 A1 * | 4/2009 | Partovi et al. | 320/108 |

(Continued)

FOREIGN PATENT DOCUMENTS

| | | |
|---|---|---|
| CN | 101228678 A | 7/2008 |
| EP | 0977297 A1 | 2/2000 |

(Continued)

OTHER PUBLICATIONS

International Search Report—PCT/US2009/056242—International Search Authority, European Patent Office, Nov. 18, 2009.

(Continued)

*Primary Examiner* — Edward Tso
*Assistant Examiner* — Alexis Boateng
(74) *Attorney, Agent, or Firm* — Knobbe, Martens, Olson & Bear, LLP

(57) ABSTRACT

Exemplary embodiments are directed to wireless charging. An electronic device may comprise at least one receive antenna integrated within an electronic device and configured to receive wireless power from a wireless transmit antenna. Further, the at least one receive antenna may be spaced from each conductive component within the electronic device having a clearance therebetween adapted to enable formation of a magnetic field around the loop conductor.

27 Claims, 14 Drawing Sheets

(56) References Cited

U.S. PATENT DOCUMENTS

| | | | |
|---|---|---|---|
| 2009/0121676 A1* | 5/2009 | Wu et al. | 320/108 |
| 2009/0121677 A1* | 5/2009 | Inoue et al. | 320/108 |
| 2009/0206791 A1* | 8/2009 | Jung | 320/108 |
| 2009/0267558 A1* | 10/2009 | Jung | 320/108 |

FOREIGN PATENT DOCUMENTS

| | | |
|---|---|---|
| JP | H07264272 A | 10/1995 |
| JP | 10069533 A | 3/1998 |
| JP | 11095922 | 4/1999 |
| JP | 2006115562 A | 4/2006 |
| JP | 2008205216 A | 9/2008 |
| WO | WO03105308 A1 | 12/2003 |
| WO | WO2007012272 A1 | 2/2007 |

OTHER PUBLICATIONS

Written Opinion—PCT/US2009/056242—ISA/EPO—Nov. 18, 2009.

* cited by examiner

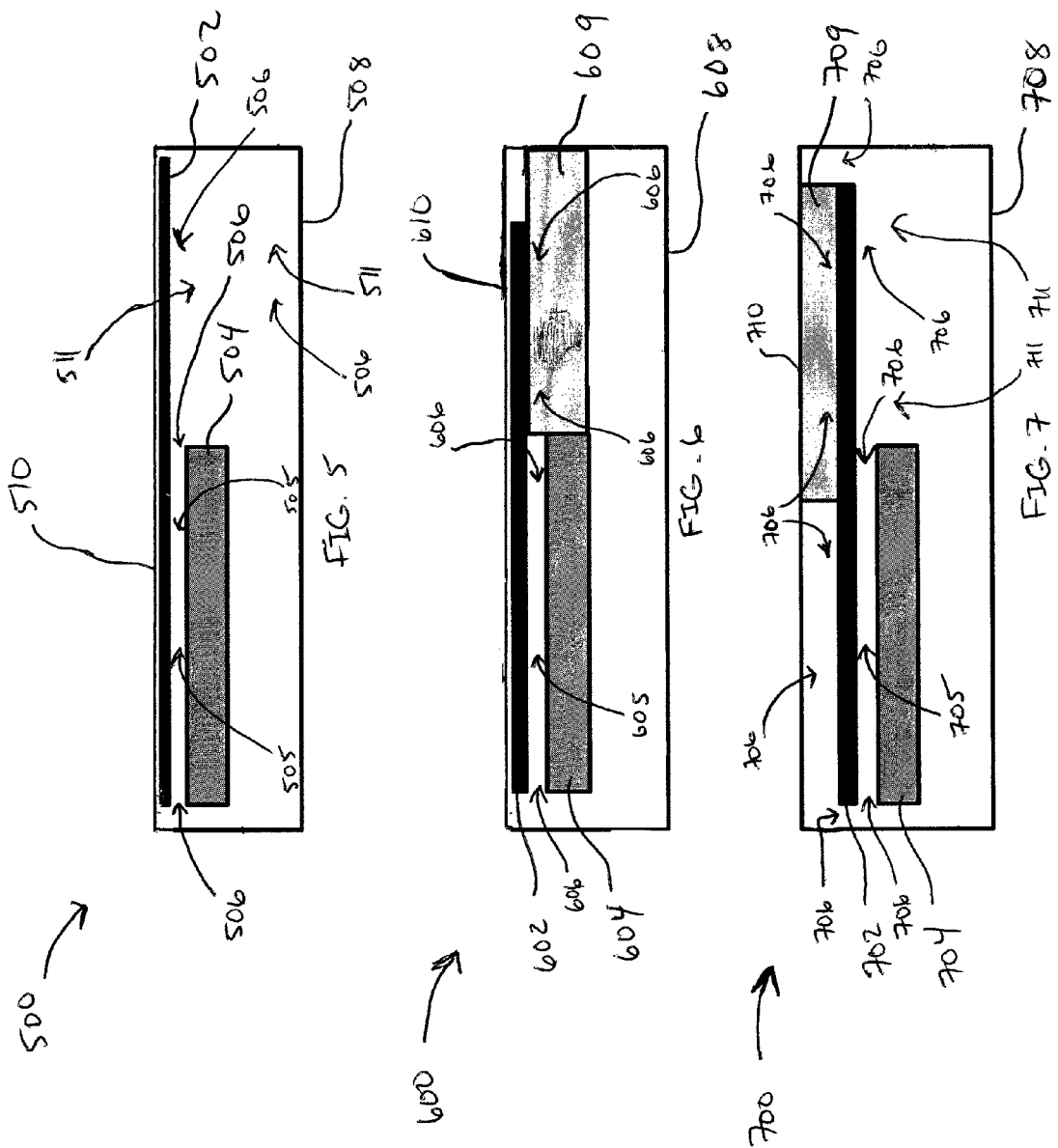

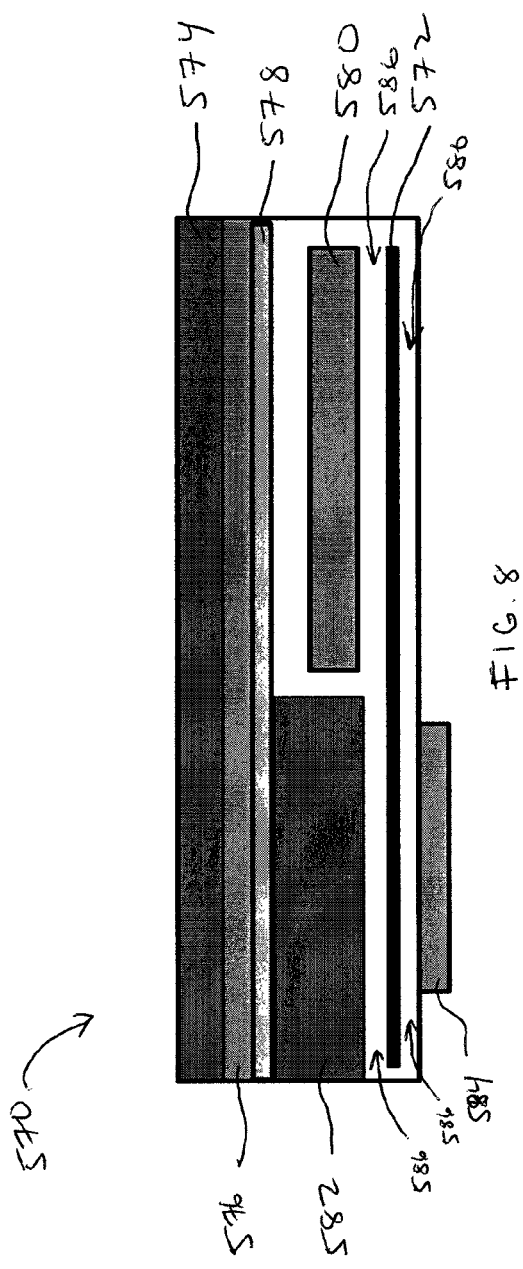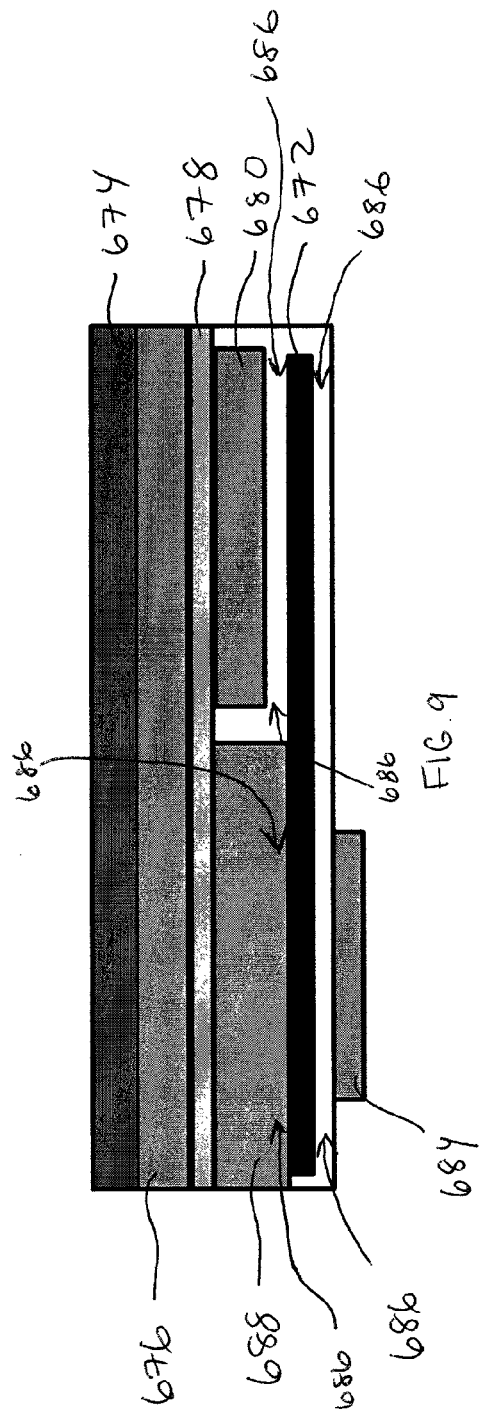

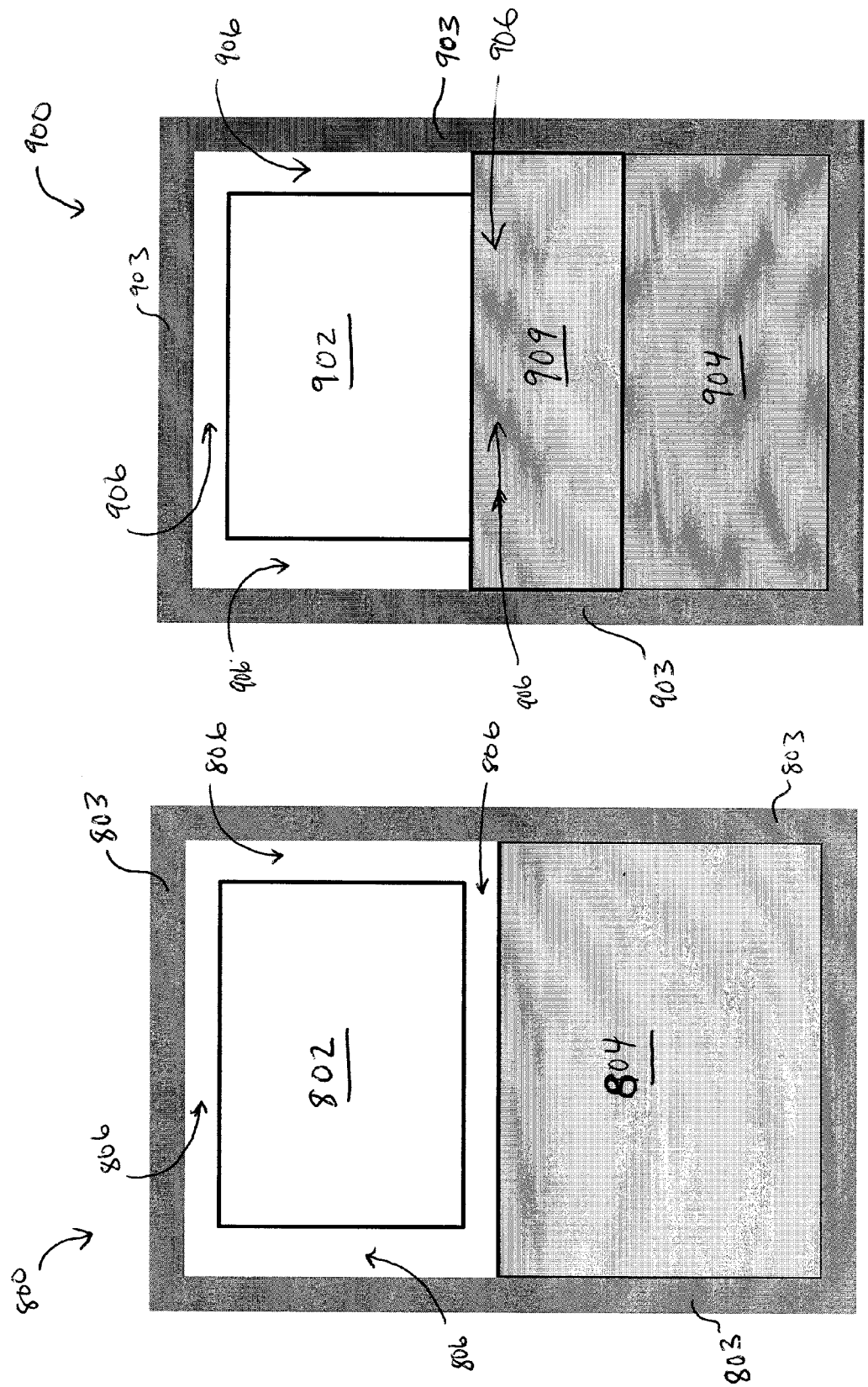

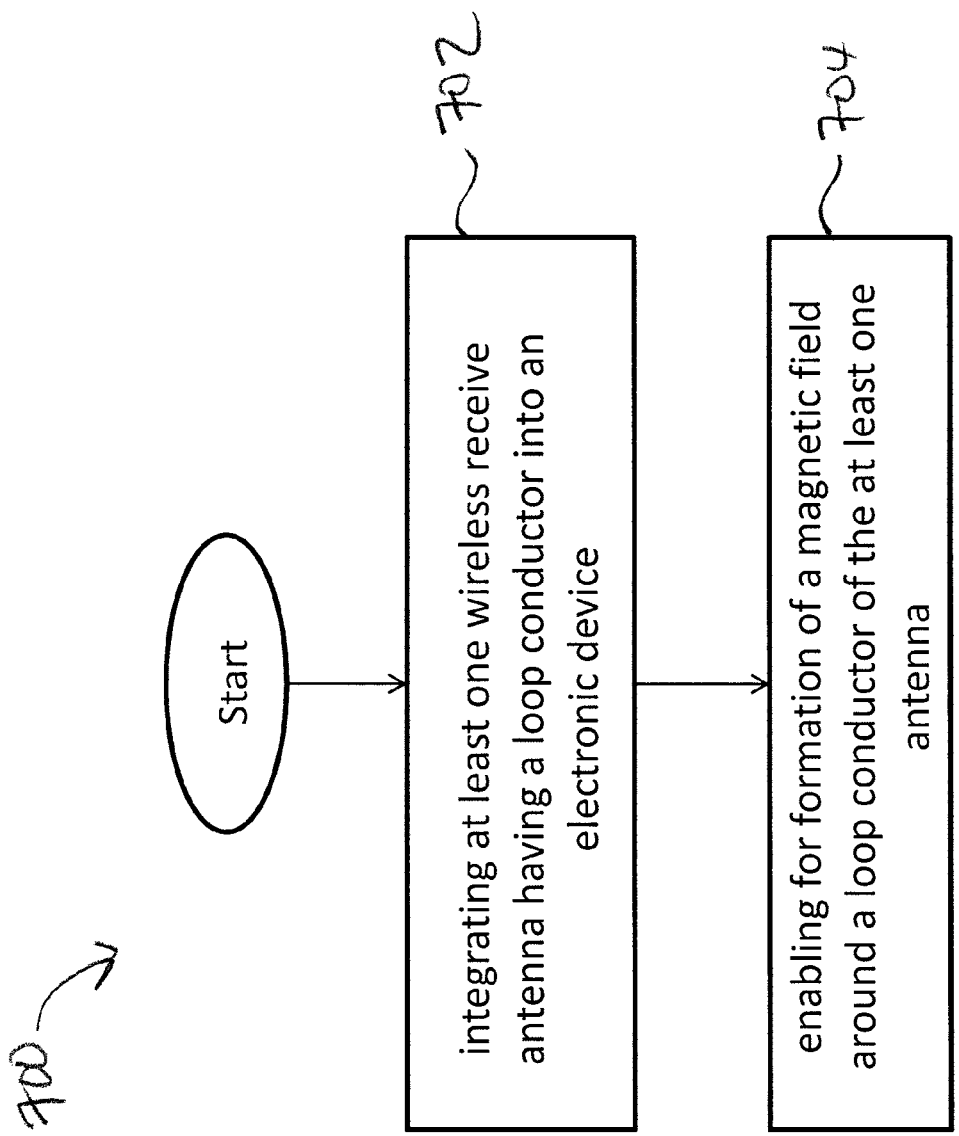

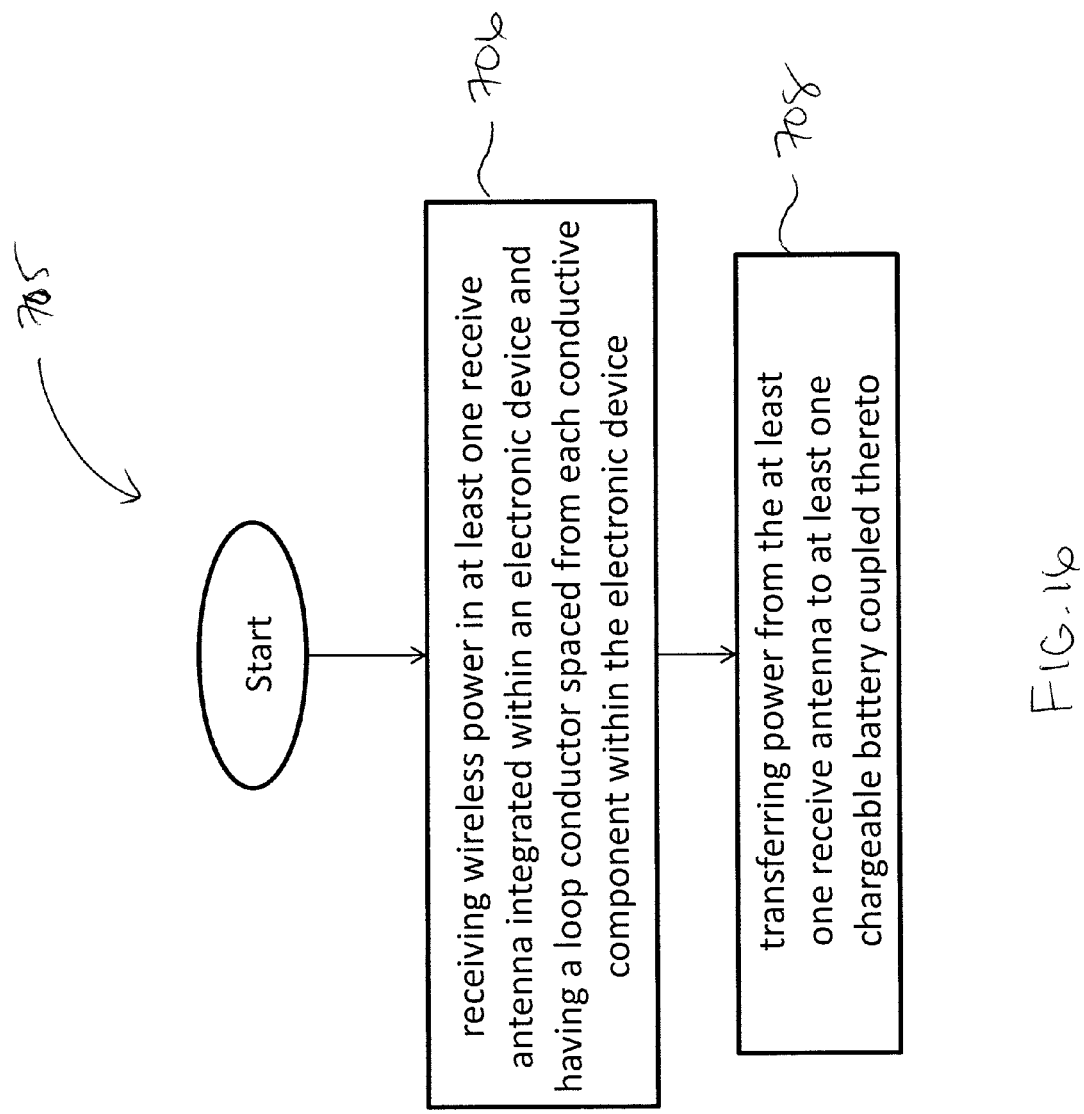

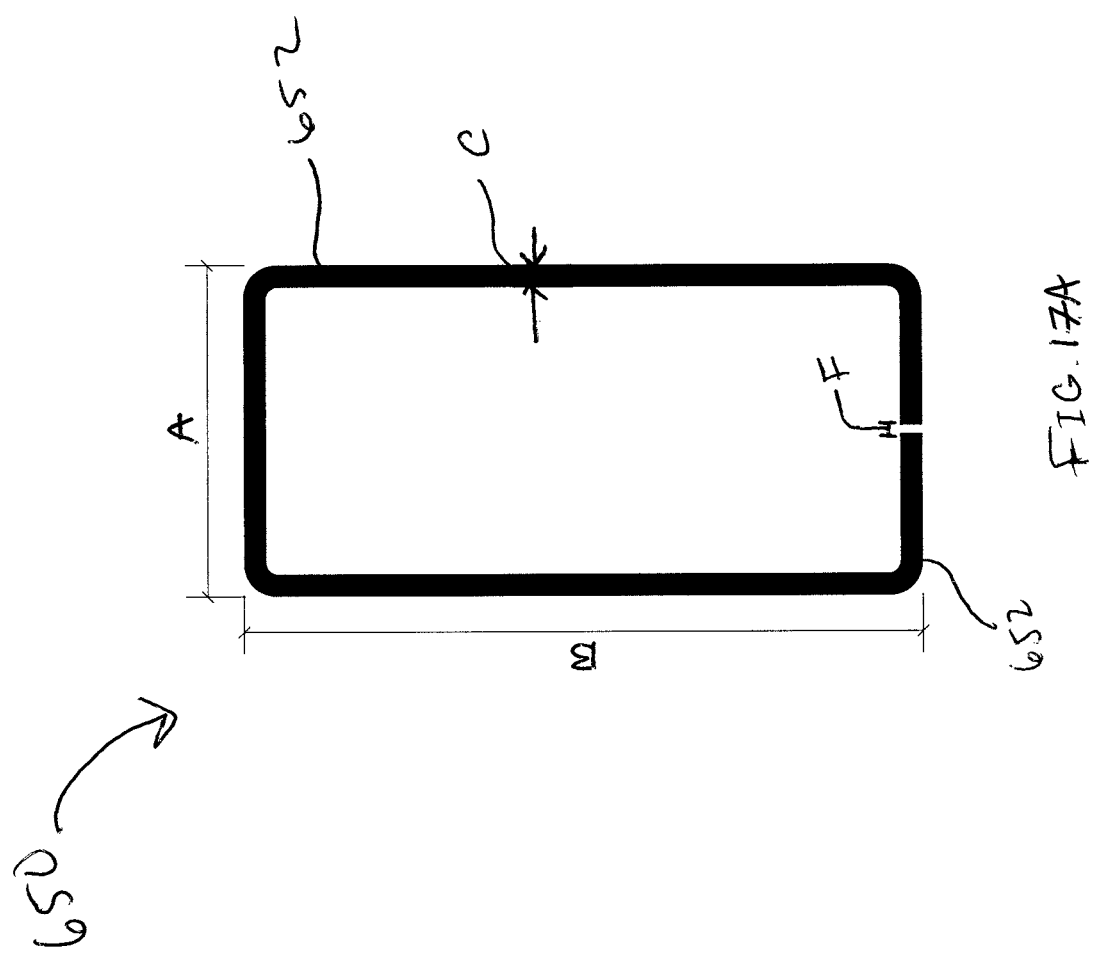

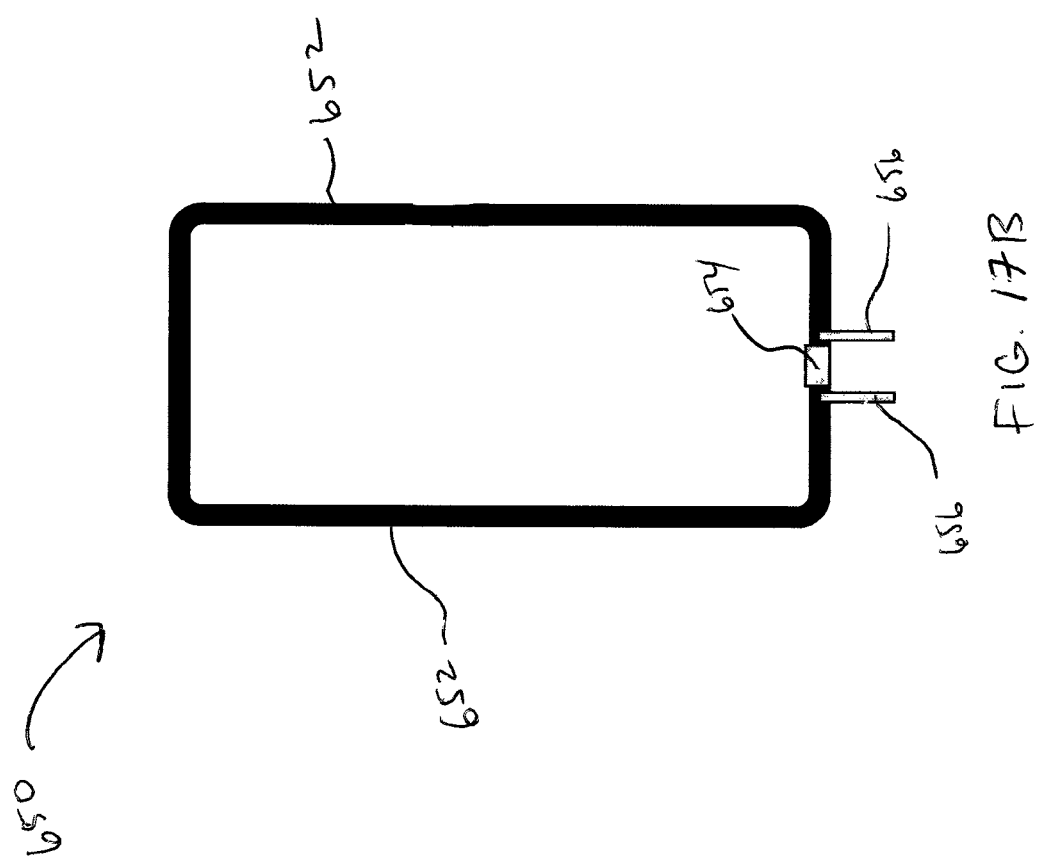

RECEIVE ANTENNA ARRANGEMENT FOR WIRELESS POWER

CLAIM OF PRIORITY UNDER 35 U.S.C. §119

This application claims priority under 35 U.S.C. §119(e) to:

U.S. Provisional Patent Application 61/095,264 entitled "INTEGRATION OF WIRELESS CHARGING ANTENNAS INTO MOBILE DEVICES" filed on Sep. 8, 2008, the disclosure of which is hereby incorporated by reference in its entirety.

BACKGROUND

1. Field

The present invention relates generally to wireless charging, and more specifically to devices, systems, and methods relating to wireless receive antennas configured for integration within an electronic device.

2. Background

Typically, each powered device such as a wireless electronic device requires its own wired charger and power source, which is usually an alternating current (AC) power outlet. Such a wired configuration becomes unweildy when many devices need charging.

Approaches are being developed that use over-the-air or wireless power transmission between a transmitter and a receiver coupled to the electronic device to be charged. The receive antenna collects the radiated power and rectifies it into usable power for powering the device or charging the battery of the device.

Wireless energy transmission may be based on coupling between a transmit antenna, a wireless receive antenna and a rectifying circuit embedded in the host electronic device to be powered or charged. An important element in wireless charging is the quality factor of a wireless receive antenna, which may be integrated within an electronic device. The quality factor of a wireless receive antenna may be affected by a magnetic field existing proximate the wireless receive antenna. In addition to a wireless receive antenna, an electronic device may include various conductive components, which may undesirably influence the performance of an associated wireless receive antenna. Specifically, the conductive components may adversely impact the behavior of a magnetic field existing adjacent a wireless receive antenna. There is a need to provide an electronic device having a receive antenna integrated therein and configured in a manner to enhance the quality factor and the inductance of the integrated receive antenna.

BRIEF DESCRIPTION OF THE DRAWINGS

FIG. 5 is a simplified, cross-sectional view of an electronic device including at least one receive antenna, according to an exemplary embodiment.

FIG. 6 is a simplified, cross-sectional view of another electronic device including at least one receive antenna, in accordance with an exemplary embodiment.

FIG. 7 is a simplified, cross-sectional view of yet another electronic device including at least one receive antenna, in accordance with an exemplary embodiment.

FIG. 8 is a cross-sectional view of an electronic device including at least one receive antenna, according to an exemplary embodiment.

FIG. 9 is a cross-sectional view of another electronic device including at least one receive antenna, in accordance with an exemplary embodiment.

FIG. 10 is a simplified, planar view of an electronic device including at least one receive antenna, according to an exemplary embodiment.

FIG. 11 is a simplified, planar view of another electronic device including at least one receive antenna, according to an exemplary embodiment.

FIG. 15 illustrates a flowchart of a method of integrating a wireless receive antenna into an electronic device, in accordance with an exemplary embodiment.

FIG. 16 illustrates a flowchart of a method of charging an electronic device, in accordance with an exemplary embodiment.

FIGS. 17A and 17B depict a single-loop conductor receive antenna, in accordance with an exemplary embodiment.

DETAILED DESCRIPTION

The word "exemplary" is used herein to mean "serving as an example, instance, or illustration." Any embodiment described herein as "exemplary" is not necessarily to be construed as preferred or advantageous over other embodiments.

The detailed description set forth below in connection with the appended drawings is intended as a description of exemplary embodiments and is not intended to represent the only embodiments in which the present invention can be practiced. The term "exemplary" used throughout this description means "serving as an example, instance, or illustration," and should not necessarily be construed as preferred or advantageous over other exemplary embodiments. The detailed description includes specific details for the purpose of providing a thorough understanding of the exemplary embodiments of the invention. It will be apparent to those skilled in the art that the exemplary embodiments of the invention may be practiced without these specific details. In some instances, well-known structures and devices are shown in block diagram form in order to avoid obscuring the novelty of the exemplary embodiments presented herein.

The term "wireless power" is used herein to mean any form of energy associated with electric fields, magnetic fields, electromagnetic fields, or otherwise that is transmitted from a transmitter to a receiver without the use of physical electromagnetic conductors. Power conversion in a system is described herein to wirelessly charge devices including, for example, mobile phones, cordless phones, iPod, MP3 players, headsets, etc. Generally, one underlying principle of wireless energy transfer includes magnetic coupled resonance (i.e., resonant induction) using frequencies, for example, below 30 MHz. However, various frequencies may be employed including frequencies where license-exempt operation at relatively high radiation levels is permitted, for example, at either below 135 kHz (LF) or at 13.56 MHz (HF). At these frequencies normally used by Radio Frequency Identification (RFID) systems, systems must comply with interference and safety standards such as EN 300330 in Europe or FCC Part 15 norm in the United States. By way of illustration and not limitation, the abbreviations LF and HF are used herein where "LF" refers to $f_0$=135 kHz and "HF" to refers to $f_0$=13.56 MHz.

Figure 1:
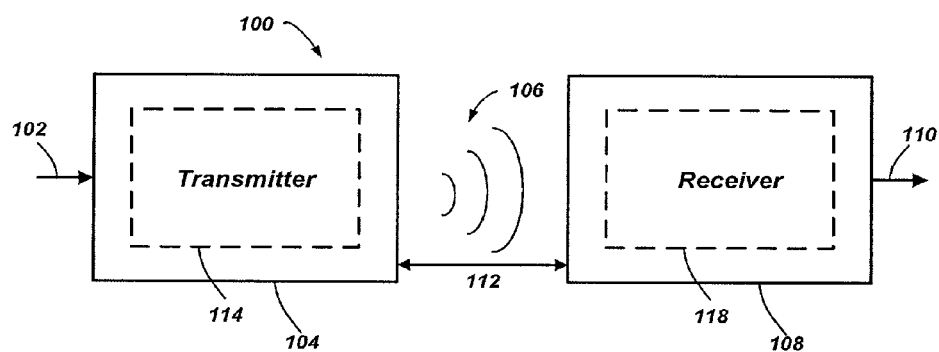
FIG. 1 illustrates a simplified block diagram of a wireless power transmission system.

FIG. 1 illustrates wireless power transmission system 100, in accordance with various exemplary embodiments. Input power 102 is provided to a transmitter 104 for generating a magnetic field 106 for providing energy transfer. A receiver 108 couples to the magnetic field 106 and generates an output power 110 for storing or consumption by a device (not shown) coupled to the output power 110. Both the transmitter 104 and the receiver 108 are separated by a distance 112. In one exemplary embodiment, transmitter 104 and receiver 108 are configured according to a mutual resonant relationship and when the resonant frequency of receiver 108 and the resonant frequency of transmitter 104 are matched, transmission losses between the transmitter 104 and the receiver 108 are minimal when the receiver 108 is located in the "near-field" of the magnetic field 106.

Transmitter 104 further includes a transmit antenna 114 for providing a means for energy transmission and receiver 108 further includes a receive antenna 118 for providing a means for energy reception or coupling. The transmit and receive antennas are sized according to applications and devices to be associated therewith. As stated, an efficient energy transfer occurs by coupling a large portion of the energy in the near-field of the transmitting antenna to a receiving antenna rather than propagating most of the energy in an electromagnetic wave to the far-field. In this near-field, a coupling may be established between the transmit antenna 114 and the receive antenna 118. The area around the antennas 114 and 118 where this near-field coupling may occur is referred to herein as a coupling-mode region.

Figure 2:
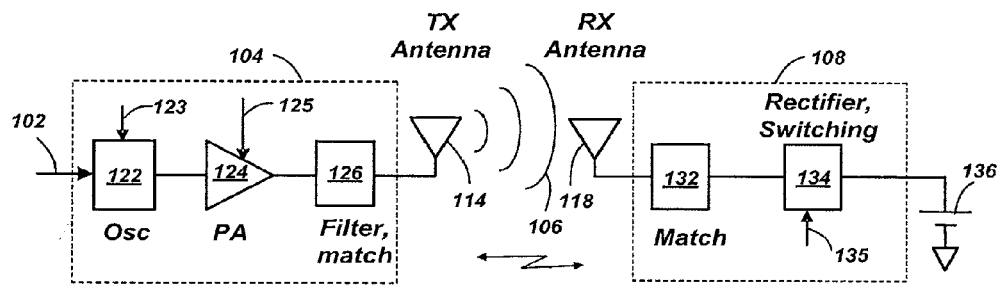
FIG. 2 illustrates a simplified schematic diagram of a wireless power transmission system.

FIG. 2 shows a simplified schematic diagram of a wireless power transmission system. The transmitter 104, driven by input power 102, includes an oscillator 122, a power amplifier 124 and a filter and matching circuit 126. The oscillator is configured to generate a desired frequency, which may be adjusted in response to adjustment signal 123. The oscillator signal may be amplified by the power amplifier 124 with an amplification amount responsive to control signal 125. The filter and matching circuit 126 may be included to filter out harmonics or other unwanted frequencies and match the impedance of the transmitter 104 to the transmit antenna 114.

The receiver 108 may include a matching circuit 132 and a rectifier and switching circuit 134 to generate a DC power output to charge a battery 136 as shown in FIG. 2 or power a device coupled to the receiver (not shown). The matching circuit 132 may be included to match the impedance of the receiver 108 to the receive antenna 118.

Figure 3:
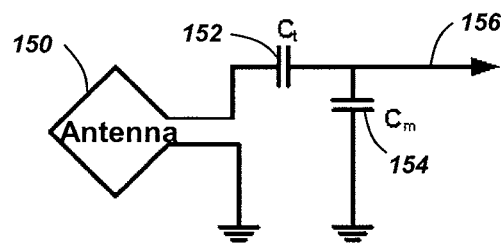
FIG. 3 illustrates a schematic diagram of a loop antenna, in accordance with exemplary embodiments.

As illustrated in FIG. 3, antennas used in exemplary embodiments may be configured as a "loop" antenna 150, which may also be referred to herein as a "magnetic," "resonant" or a "magnetic resonant" antenna. Loop antennas may be configured to include an air core or a physical core such as a ferrite core. Furthermore, an air core loop antenna allows the placement of other components within the core area. In addition, an air core loop may more readily enable placement of the receive antenna 118 (FIG. 2) within a plane of the transmit antenna 114 (FIG. 2) where the coupled-mode region of the transmit antenna 114 (FIG. 2) may be more effective.

As stated, efficient transfer of energy between the transmitter 104 and receiver 108 occurs during matched or nearly matched resonance between the transmitter 104 and the receiver 108. However, even when resonance between the transmitter 104 and receiver 108 are not matched, energy may be transferred at a lower efficiency. Transfer of energy occurs by coupling energy from the near-field of the transmitting antenna to the receiving antenna residing in the neighborhood where this near-field is established rather than propagating the energy from the transmitting antenna into free space.

The resonant frequency of the loop antennas is based on the inductance and capacitance. Inductance in a loop antenna is generally the inductance created by the loop, whereas, capacitance is generally added to the loop antenna's inductance to create a resonant structure at a desired resonant frequency. As a non-limiting example, capacitor 152 and capacitor 154 may be added to the antenna to create a resonant circuit that generates a sinusoidal or quasi-sinusoidal signal 156. Accordingly, for larger diameter loop antennas, the size of capacitance needed to induce resonance decreases as the diameter or inductance of the loop increases. Furthermore, as the diameter of the loop antenna increases, the efficient energy transfer area of the near-field increases for "vicinity" coupled devices. Of course, other resonant circuits are possible. As another non-limiting example, a capacitor may be placed in parallel between the two terminals of the loop antenna. In addition, those of ordinary skill in the art will recognize that for transmit antennas the resonant signal 156 may be an input to the loop antenna 150.

Exemplary embodiments of the invention include coupling power between two antennas that are in the near-fields of each other. As stated, the near-field is an area around the antenna in which electromagnetic fields exist but may not propagate or radiate away from the antenna. They are typically confined to a volume that is near the physical volume of the antenna. In the exemplary embodiments of the invention, antennas such as single and multi-turn loop antennas are used for both transmit (Tx) and receive (Rx) antenna systems since most of the environment possibly surrounding the antennas is dielectric and thus has less influence on a magnetic field compared to an electric field. Furthermore, antennas dominantly configured as "electric" antennas (e.g., dipoles and monopoles) or a combination of magnetic and electric antennas is also contemplated.

The Tx antenna can be operated at a frequency that is low enough and with an antenna size that is large enough to achieve good coupling efficiency (e.g., >10%) to a small Rx antenna at significantly larger distances than allowed by far-field and inductive approaches mentioned earlier. If the Tx antenna is sized correctly, high coupling efficiencies (e.g., 30%) can be achieved when the Rx antenna on a host device is placed within a coupling-mode region (i.e., in the near-field or a strongly coupled regime) of the driven Tx loop antenna.

Figure 4:
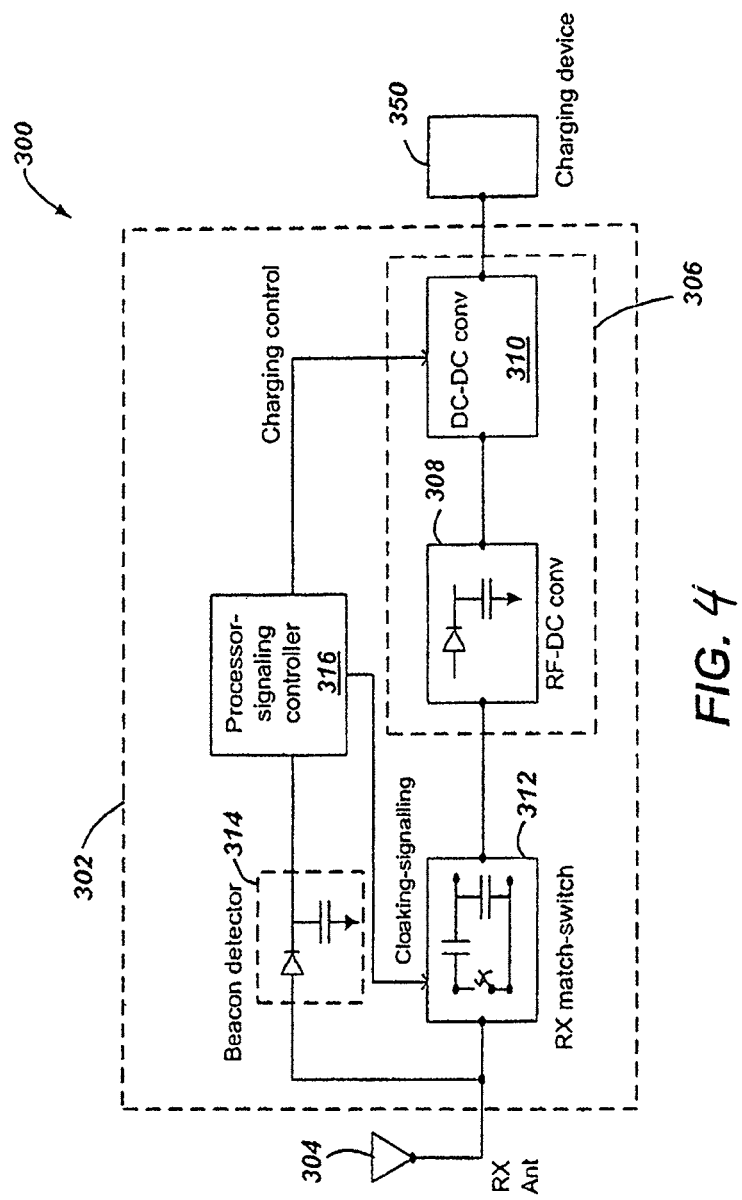
FIG. 4 is a simplified block diagram of a receiver, in accordance with an exemplary embodiment.

FIG. 4 is a block diagram of a receiver, in accordance with an embodiment. A receiver 300 includes receive circuitry 302 and a receive antenna 304. Receiver 300 further couples to device 350 for providing received power thereto. It should be noted that receiver 300 is illustrated as being external to device 350 but may be integrated into device 350. Generally, energy is propagated wirelessly to receive antenna 304 and then coupled through receive circuitry 302 to device 350.

Receive antenna 304 is tuned to resonate at the same frequency, or near the same frequency, as transmit antenna 204 (FIG. 10). Receive antenna 304 may be similarly dimensioned with transmit antenna 204 or may be differently sized based upon the dimensions of an associated device 350. By way of example, device 350 may be a portable electronic device having diametric or length dimension smaller that the diameter of length of transmit antenna 204. In such an example, receive antenna 304 may be implemented as a multi-turn antenna in order to reduce the capacitance value of a tuning capacitor (not shown) and increase the receive antenna's impedance. By way of example, receive antenna 304 may be placed around the substantial circumference of device 350 in order to maximize the antenna diameter and reduce the number of loop turns (i.e., windings) of the receive antenna and the inter-winding capacitance.

Receive circuitry 302 provides an impedance match to the receive antenna 304. Receive circuitry 302 includes power conversion circuitry 306 for converting a received RF energy source into charging power for use by device 350. Power conversion circuitry 306 includes an RF-to-DC converter 308 and may also in include a DC-to-DC converter 310. RF-to-DC converter 308 rectifies the RF energy signal received at receive antenna 304 into a non-alternating power while DC-to-DC converter 310 converts the rectified RF energy signal into an energy potential (e.g., voltage) that is compatible with device 350. Various RF-to-DC converters are contemplated including partial and full rectifiers, regulators, bridges, doublers, as well as linear and switching converters.

Receive circuitry 302 may further include switching circuitry 312 for connecting receive antenna 304 to the power conversion circuitry 306 or alternatively for disconnecting the power conversion circuitry 306. Disconnecting receive antenna 304 from power conversion circuitry 306 not only suspends charging of device 350, but also changes the "load" as "seen" by the transmitter 200 (FIG. 2) as is explained more fully below. As disclosed above, transmitter 200 includes load sensing circuit 216 which detects fluctuations in the bias current provided to transmitter power amplifier 210. Accordingly, transmitter 200 has a mechanism for determining when receivers are present in the transmitter's near-field.

Receive circuitry 302 may further include signaling detector and beacon circuitry 314 used to identify received energy fluctuations, which may correspond to informational signaling from the transmitter to the receiver. Furthermore, signaling and beacon circuitry 314 may also be used to detect the transmission of a reduced RF signal energy (i.e., a beacon signal) and to rectify the reduced RF signal energy into a nominal power for awakening either un-powered or power-depleted circuits within receive circuitry 302 in order to configure receive circuitry 302 for wireless charging.

Receive circuitry 302 further includes processor 316 for coordinating the processes of receiver 300 described herein including the control of switching circuitry 312 described herein. Cloaking of receiver 300 may also occur upon the occurrence of other events including detection of an external wired charging source (e.g., wall/USB power) providing charging power to device 350. Processor 316, in addition to controlling the cloaking of the receiver, may also monitor beacon circuitry 314 to determine a beacon state and extract messages sent from the transmitter. Processor 316 may also adjust DC-to-DC converter 310 for improved performance.

The various exemplary embodiments disclosed herein relate to one or more wireless receive antennas configured for wireless charging and further configured to be integrated within an electronic device in a manner so as to provide a clearance (i.e., a physical separation) between a loop conductor of each receive antenna and any conductive component within the electronic device. Accordingly, the clearance may provide an escape path that may enable a magnetic field to exist around the loop conductor. It is noted that an "escape path," as referenced herein, may exist within a vacant area void of any component, may exist within an area consisting of non-conductive material (e.g., plastic), or any combination thereof. It is further noted that according to the various exemplary embodiments, wireless receive antennas, as described herein, may either be configured to be retrofit to an existing electronic device, or made as part of its initial design and manufacturing.

As an example, according to one exemplary embodiment, a wireless receive antenna may be integrated within an electronic device in a manner wherein a loop conductor of the wireless receive antenna is separated from each conductive component within the electronic device a sufficient distance so as to prevent an undamped quality factor of the associated wireless receive antenna from degrading more than a factor of about four upon integration thereof. Stated another way, an undamped quality factor of a wireless receive antenna should not be more than substantially four times greater than a quality factor of the wireless receive antenna upon integration into an electronic device. It is noted that degradation of a quality factor more than a factor of four may indicate that a separation distance between the antenna and at least one conductive component is inadequate.

According to another exemplary embodiment, a wireless receive antenna may be integrated within an electronic device in a manner wherein a loop conductor of the wireless receive antenna is separated from each conductive component within the electronic device a sufficient distance so as to degrade an undamped quality factor of the associated wireless receive antenna by at least a factor of two upon integration thereof. Stated another way, an undamped quality factor of a wireless receive antenna should be more than substantially two times greater than a quality factor of the wireless receive antenna upon integration into an electronic device. As a more specific, non-limiting example, a loop conductor of a wireless receive antenna may be integrated into an electronic device and separated from each conductive component within the electronic device by at least about 1 to 2 millimeters.

It is noted that the wireless receive antennas, as described herein, may comprise electrically small antennas. As will be understood by one having ordinary skill in the art, an electrically small antenna is one with a maximum geometrical dimension that is much less than the operating wavelength. An electrically small antenna may be defined as an antenna that can be fitted into a fraction of a radiansphere, which is a sphere of radius $r_{max}$ defined as:

$$r_{max}=1/k=\lambda/2\pi=c/2\pi f=d_{max}/2; \quad (1)$$

where: k is the wavenumber, l is the wavelength, c is the speed of light, f is the frequency, and $d_{max}$ is the diameter of the radiansphere.

FIG. 5 depicts a simplified, cross-sectional view of an electronic device 500 having at least one wireless receive antenna integrated therein, according to an exemplary embodiment. Electronic device 500 may comprise any electronic device, such as, for example only, a cellular telephone, a portable media player, a camera, a gaming device, a navigation device, a headset (e.g., a Bluetooth headset), a tool, a toy, or any combination thereof. Electronic device 500 may include a first surface 510 and a second surface 508, wherein second surface 508 may include a metal frame. Further, electronic device 500 includes a loop conductor 502 of a wireless receive antenna, which may be configured for wireless charging and may be operably coupled to a chargeable battery 504, which may include a metal housing.

As illustrated in FIG. 5, loop conductor 502 is separated from each of first surface 508 and chargeable battery 504 having a clearance 506 therebetween. The term "clearance," as used herein, may comprise a vacant space, a space comprising a non-conductive component, or any combination thereof. In the example depicted in FIG. 5, a portion of clearance 506 includes a vacant space 505 positioned between loop conductor 502 and chargeable battery 504. Further, another portion of clearance 506 includes a vacant space 511 positioned between loop conductor 502 and first surface 508. Accordingly, clearance 506 may provide an escape path for a magnetic field, which may be associated with and adjacent to loop conductor 502. Specifically, electronic device 500, as configured, may provide an escape path entirely around loop conductor 502. As mentioned above, an escape path adjacent loop conductor 502 may enable a magnetic field to exist around loop conductor 502 and, thus, the functionality of an associated wireless receive antenna may be enhanced. Furthermore, any adverse affect on a magnetic field adjacent to and associated with loop conductor 502 resulting from a conductive component (i.e., chargeable battery 504, second surface 508, or both), may be limited.

It is noted that a wireless receive antenna may be integrated into electronic device 500 in a manner wherein loop conductor 502 of the wireless receive antenna is separated from each of first surface 508 and chargeable battery 504 a sufficient distance so as to prevent an undamped quality factor of the wireless receive antenna from degrading more than a factor of about four upon integration thereof. Stated another way, an undamped quality factor of a wireless receive antenna should not be more than substantially four times greater than a quality factor of the wireless receive antenna upon integration into electronic device 500. As a more specific, non-limiting example, loop conductor 502 may be integrated into electronic device 500 and separated from chargeable battery 504 by about 1 to 2 millimeters.

FIG. 6 depicts a simplified, cross-sectional view of another electronic device 600 having at least one receive antenna integrated therein, according to an exemplary embodiment. Similarly to electronic device 500 depicted in FIG. 5, electronic device 600 includes a first surface 610 and a second surface 608, wherein second surface 608 may include a metal frame. Electronic device 500 further includes a loop conductor 602 of a wireless receive antenna, which may be configured for wireless charging and may be operably coupled to a chargeable battery 604, which may include a metal housing. Furthermore, electronic device 600 includes a component 609, which is adjacent a portion of loop conductor 602 and consists of non-conductive material.

As illustrated in FIG. 6, loop conductor 602 is spaced from chargeable battery 604 with a clearance 606 positioned therebetween. Specifically, a portion of clearance 606 includes a vacant space 605 positioned between loop conductor 602 and chargeable battery 604. Therefore, any adverse affect on a magnetic field adjacent to and associated with loop conductor 602 caused by chargeable battery 604 may be limited.

Moreover, it is noted that another portion of clearance 606 may comprise a portion of component 609. As mentioned above, because a magnetic field may exist in and around non-conductive parts, component 609 may not adversely affect a magnetic field associated with and adjacent to loop conductor 602. Accordingly, clearance 606 may provide an escape path for a magnetic field, which may be associated with and adjacent to loop conductor. Specifically, electronic device 600, as configured, may provide an escape path entirely around loop conductor 602. As mentioned above, an escape path adjacent loop conductor 602 may enable a magnetic field to exist around loop conductor 602 and, thus, the functionality of an associated wireless receive antenna may be enhanced.

It is further noted that a wireless receive antenna may be integrated into electronic device 600 in a manner wherein loop conductor 602 of the wireless receive antenna is separated from chargeable battery 604 a sufficient distance so as to prevent an undamped quality factor of the wireless receive antenna from degrading more than a factor of about four upon integration thereof. Stated another way, an undamped quality factor of a wireless receive antenna should not be more than substantially four times greater than a quality factor of the wireless receive antenna upon integration into electronic device 600. As a more specific, non-limiting example, loop conductor 602 may be integrated into electronic device 600 and separated from chargeable battery 604 by about 1 to 2 millimeters.

FIG. 7 depicts a simplified, cross-sectional view of yet another example of an electronic device 700 having at least one receive antenna integrated therein, according to an exemplary embodiment. Similarly to electronic devices 500 and 600 described above, electronic device 700 includes a first surface 710 and a second surface 708, which may include a metal frame. Additionally, electronic device 700 may further include a loop conductor 702 of a wireless receive antenna that is configured for wireless charging and operably coupled to a chargeable battery 704, which may include a metal housing. Furthermore, electronic device 700 includes a component 709, which is adjacent loop conductor 702 and consists of non-conductive materials.

As depicted in FIG. 7, loop conductor 702 is remote from each of chargeable battery 704 and second surface 708 with a clearance 706 positioned therebetween. Specifically, a portion of clearance 706 includes a vacant space 705 positioned between loop conductor 702 and chargeable battery 704. Further, another portion of clearance 706 includes a vacant space 711 positioned between loop conductor 702 and second surface 708. As a result, any adverse affect on a magnetic field adjacent to and associated with loop conductor 702 as a result of chargeable battery 704, second surface 708, or both, may be limited.

Moreover, it is noted that another portion of clearance 706 may comprise a portion of component 709. As mentioned above, because a magnetic field may exist in and around non-conductive parts, a magnetic field adjacent to and associated with loop conductor 702 may not be adversely affected by component 709. Therefore, clearance 706 may provide an escape path for a magnetic field, which may be associated with and adjacent to loop conductor 702. As mentioned above, an escape path adjacent loop conductor 702 may enable a magnetic field to exist around loop conductor 702 and, thus, the functionality of an associated wireless receive antenna may be enhanced. Specifically, electronic device 700, as configured, may provide an escape path entirely around loop conductor 702.

It is further noted that a wireless receive antenna may be integrated into electronic device 700 in a manner wherein loop conductor 702 of the wireless receive antenna is separated from each of second surface 708 and chargeable battery 704 a sufficient distance so as to prevent an undamped quality factor of the wireless receive antenna from degrading more than a factor of about four upon integration thereof. Stated another way, an undamped quality factor of a wireless receive antenna should not be more than substantially four times greater than a quality factor of the wireless receive antenna upon integration into electronic device 700. As a more specific, non-limiting example, loop conductor 702 may be integrated into electronic device 700 and separated from chargeable battery 704 by about 1 to 2 millimeters.

FIG. 8 illustrates a cross-sectional view of an electronic device 570 having at least one receive antenna integrated therein, in accordance with an exemplary embodiment. Electronic device 570 includes a display device 574, which may comprise a metal frame surrounding a display area and a keyboard (not shown). Electronic device 570 also includes an electronics module 576 adjacent a printed circuit board 578, each of which may include conductive material. In addition, electronic device 570 includes a battery 580 having a metal housing and an RF electronics and antenna module 582 that may include various conductive components. Furthermore, electronic device 570 includes a camera 584 having a metal housing.

As illustrated in FIG. 8, a loop conductor 572 of a wireless receive antenna, which may be configured for wireless charging, may be integrated within electronic device 570 in a manner so as to include a clearance 586 positioned between loop conductor 572 and each conductive component within electronic device 570. Accordingly, clearance 586 may provide an escape path for a magnetic field, which may exist adjacent loop conductor 572. As mentioned above, an escape path adjacent loop conductor 572 may enable a magnetic field to exist around loop conductor 572, and, thus may enhance the functionality of an associated wireless receive antenna. Specifically, electronic device 570, as configured, may provide an escape path entirely around loop conductor 572. Further, any adverse affect on a magnetic field adjacent to and associated with loop conductor 572 caused by one or more conductive components may be limited.

It is further noted that a wireless receive antenna may be integrated into electronic device 570 in a manner wherein loop conductor 572 of the wireless receive antenna is separated from each conductive component within electronic device 570 a sufficient distance so as to prevent an undamped quality factor of the wireless receive antenna from degrading more than a factor of about four upon integration thereof. Stated another way, an undamped quality factor of a wireless receive antenna should not be more than substantially four times greater than a quality factor of the wireless receive antenna upon integration into electronic device 570. As a more specific, non-limiting example, loop conductor 572 may be integrated into electronic device 570 and separated from each conductive component by at least about 1 to 2 millimeters.

FIG. 9 illustrates a cross-section view of another electronic device 670 having at least one receive antenna integrated therein, in accordance with an exemplary embodiment. Electronic device 670 includes a display device 674, which may comprise a metal frame surrounding a display area and a keyboard (not shown). Electronic device 670 also includes an electronics module 676 adjacent a printed circuit board 678, each of which may include conductive material. In addition, electronic device 670 includes a battery 680 having a metal housing and an RF electronics and antenna module 682 that may include various conductive components. Furthermore, electronic device 670 includes a camera 684 having a metal housing. Additionally, electronic device 670 includes a component 688, which is adjacent wireless receive antenna 672 and consisting of non-conductive material.

As depicted in FIG. 9, a loop conductor 672 of a receive antenna, which is configured for wireless charging, may be integrated within electronic device 670 in a manner so as to include a clearance 686 positioned between loop conductor 672 and each conductive component within electronic device 670. Stated another way, loop conductor 672 is spaced from each conductive component within electronic device 670 by a portion of clearance 686. As a result, any adverse affect on a magnetic field adjacent to and associated with loop conductor 672 caused by one or more conductive components within electronic device 670 may be limited.

Moreover, it is noted that another portion of clearance 686 may comprise a portion of component 688. As described above, a magnetic field may exist in and around non-conductive components, and, therefore, component 688 may not adversely affect a magnetic field adjacent to loop conductor 672. Accordingly, clearance 686 may provide an escape path for a magnetic field, which may be associated with and adjacent to loop conductor 672. Specifically, electronic device 670, as configured, may provide an escape path entirely around loop conductor 672. As mentioned above, an escape path adjacent loop conductor 672 may enable a magnetic field to exist around loop conductor 672 and, thus, may enhance the functionality of an associated wireless receive antenna.

It is further noted that a wireless receive antenna may be integrated into electronic device 670 in a manner wherein loop conductor 672 of the wireless receive antenna is separated from each conductive component within electronic device 670 a sufficient distance so as to prevent an undamped quality factor of the wireless receive antenna from degrading more than a factor of about four upon integration thereof. Stated another way, an undamped quality factor of a wireless receive antenna should not be more than substantially four times greater than a quality factor of the wireless receive antenna upon integration into electronic device 670. As a more specific, non-limiting example, loop conductor 672 may be integrated into electronic device 670 and separated from each conductive component by about at least about 1 to 2 millimeters.

FIG. 10 illustrates a simplified, planar view of an electronic device 800 having at least one receive antenna integrated therein and configured for wireless charging, according to an exemplary embodiment. Electronic device 800 may include an external surface 803, which may comprise a metal frame. Additionally, electronic device 800 may further include a loop conductor 802 of a wireless receive antenna that may be operably coupled to a chargeable battery 804, which may include a metal housing. As illustrated, loop conductor 802 is integrated within electronic device 800 and separated from each of chargeable battery 804 and external surface 803 by a clearance 806. As an example, loop conductor 802 may be integrated into electronic device 800 and separated from each of external surface 803 and chargeable battery 804 a sufficient distance so as to prevent an undamped quality factor of an associated wireless receive antenna from degrading more than a factor of about four upon integration. Stated another way, an undamped quality factor of a wireless receive antenna should not be more than substantially four times greater than a quality factor of the wireless receive antenna upon integration into electronic device 800. As a more specific, non-limiting example, loop conductor 802 may be integrated into electronic device 800 and separated from each of chargeable battery 804 and external surface 803 by about 1 to 2 millimeters or more.

Accordingly, clearance 806 may provide an escape path for a magnetic field that may be adjacent to and associated with loop conductor 802. Specifically, electronic device 800, as configured, may provide an escape path entirely around loop conductor 802. As mentioned above, an escape path adjacent loop conductor 802 may enable a magnetic field to exist around loop conductor 802 and, thus, may enhance the functionality of an associated wireless receive antenna. Moreover, any adverse affect on a magnetic field adjacent to and associated with loop conductor 802 caused by external surface 803, chargeable battery 804, or both, may be limited.

FIG. 11 depicts a simplified, planar view of yet another electronic device 900 having at least one wireless receive antenna integrated therein and configured for wireless charging, according to an exemplary embodiment. Similarly to electronic device 800 described above, electronic device 900 may include an external surface 903, which may comprise a metal frame. Additionally, electronic device 900 may further include a loop conductor 902 of a wireless receive antenna that may be operably coupled to a chargeable battery 904, which may include a metal housing. Furthermore, electronic device 900 includes a component 909, which is adjacent loop conductor 902 and consists of non-conductive material.

As illustrated in FIG. 11, loop conductor 902 may be integrated within electronic device 900 and separated from external surface 903 by a portion of a clearance 906. Accordingly, any adverse affect on a magnetic field adjacent to and associated with loop conductor 902 caused by external surface 903 may be limited. As an example, loop conductor 902 may be integrated into electronic device 900 and separated from external surface 903 a sufficient distance so as to prevent an undamped quality factor of an associated wireless receive antenna from degrading more than a factor of about four upon integration thereof. Stated another way, an undamped quality factor of a wireless receive antenna should not be more than substantially four times greater than a quality factor of the wireless receive antenna upon integration into electronic device 900. As a more specific, non-limiting example, loop conductor 902 may be integrated into electronic device 900 and separated from external surface 903 by about 1 to 2 millimeters.

Furthermore, it is noted that another portion of clearance 906 may comprise a portion of component 909. Accordingly, electronic device 900, as configured, may provide an escape path entirely around loop conductor 902. As mentioned above, an escape path adjacent loop conductor 902 may enable a magnetic field to exist around loop conductor 902 and, thus, may enhance the functionality of an associated wireless receive antenna.

Figure 12:
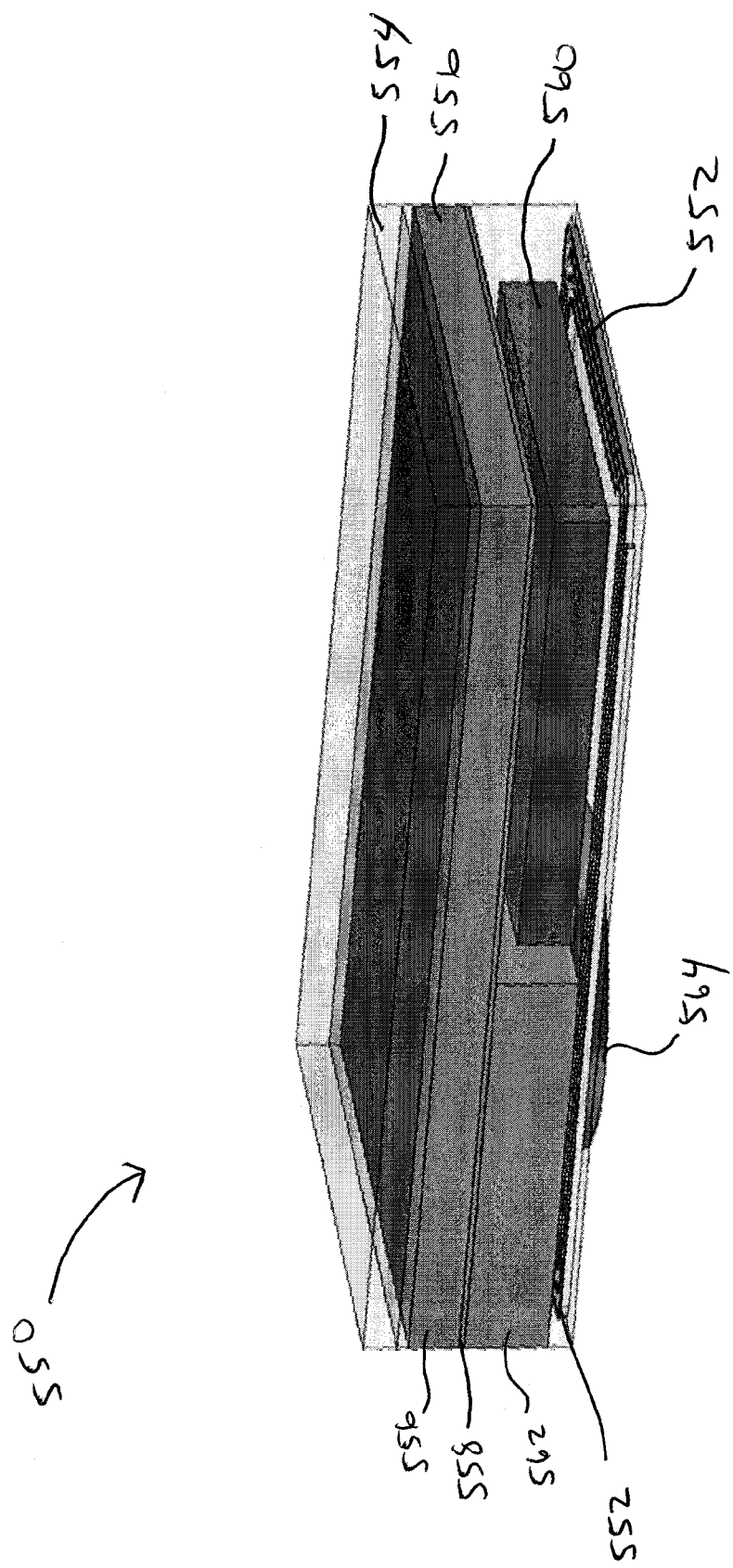
FIG. 12 depicts an electronic device including at least one receive antenna, in accordance with an exemplary embodiment.

FIG. 12 depicts a view of an electronic device 550 having at least one receive antenna integrated therein, in accordance with an exemplary embodiment. Electronic device 550 includes a display device 554, which may comprise a metal frame surrounding a display area and a keyboard (not shown). Electronic device 550 also includes an electronics module 556 adjacent a printed circuit board 558, each of which may include conductive material. In addition, electronic device 550 includes a battery 560 having a metal housing and an RF electronics and antenna module 562 that may include various conductive components. Furthermore, electronic device 550 includes a camera 564 having a metal housing.

Figure 13:
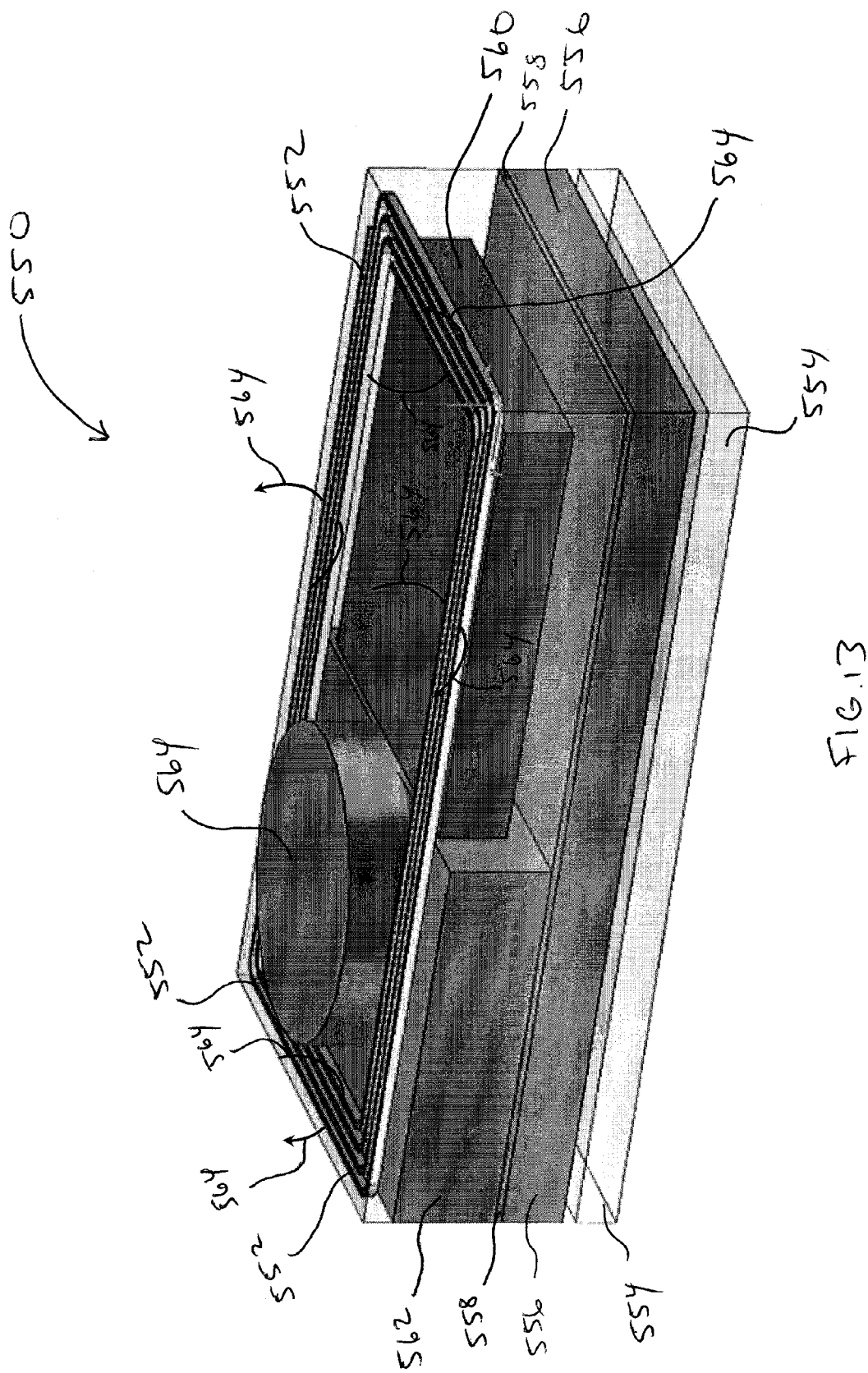
FIG. 13 is another illustration depicting the electronic device of FIG. 12.

FIG. 13 illustrates another view of electronic device 550. As illustrated in each of FIG. 12 and FIG. 13, a loop conductor 552 of a wireless receive antenna is physically spaced (i.e. a clearance exists) from each conductive component within electronic device 550. Specifically, a clearance exists between loop conductor 552 and each of camera 564, battery 560, and RF electronics and antenna module 562. Accordingly, this spacing may provide an escape path (illustrated by arrows 564) for a magnetic field existing adjacent loop conductor 552. It is noted that, electronic device 550, as configured, may provide an escape path entirely around loop conductor 552. As mentioned above, an escape path adjacent loop conductor 552 may enable a magnetic field to exist around loop conductor 552 and, thus, the functionality of an associated wireless receive antenna may be enhanced.

As an example, a wireless receive antenna may be integrated into electronic device 550 in a manner wherein loop conductor 552 of the wireless receive antenna is separated from each conductive component within electronic device 550 a sufficient distance so as to prevent an undamped quality factor of the wireless receive antenna from degrading more than a factor of about four upon integration thereof. Stated another way, an undamped quality factor of a wireless receive antenna should not be more than substantially four times greater than a quality factor of the wireless receive antenna upon integration into electronic device 500. As a more specific, non-limiting example, loop conductor 552 may be integrated into electronic device 550 and separated from each conductive component by about 1 to 2 millimeters or more.

Figure 14:
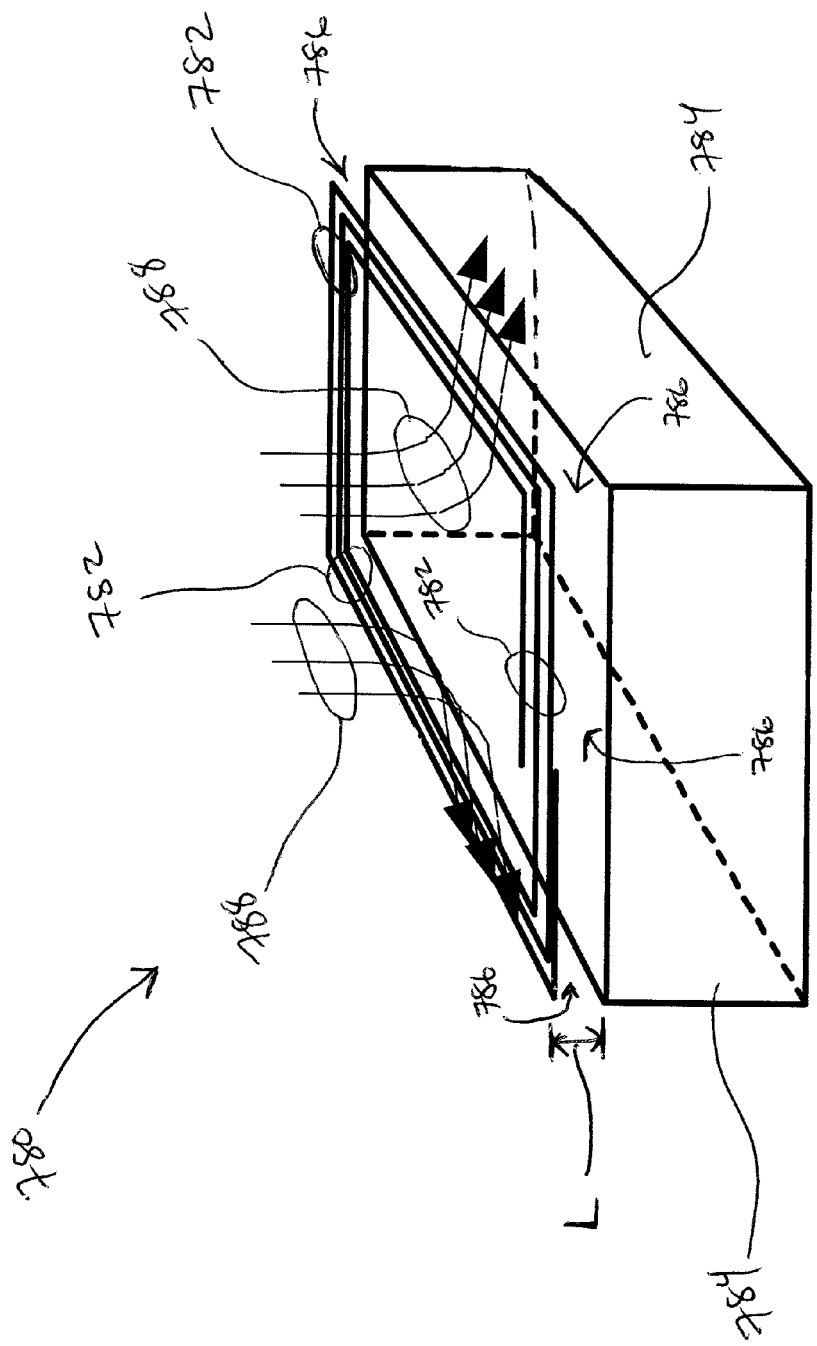
FIG. 14 illustrates an electronic device having a loop conductor of an integrated receive antenna spaced from a conductive component, according to an exemplary embodiment.

FIG. 14 is a simplified illustration of an electronic device 780 including a loop conductor 782 of a wireless receive antenna and a conductive component 784. For example, conductive component 784 may comprise a rechargeable battery having a metal housing. As illustrated in FIG. 14, loop conductor 782 is separated from conductive component 784 by a distance L having a clearance 786 therebetween. As a non-limiting example, distance L may have a range of about 1 to 2 millimeters. Furthermore, clearance 786 may comprise, for example only, a vacant space, a non-conductive component, or any combination thereof. Accordingly, clearance 786 may provide an escape path (depicted by arrows 788) for a magnetic field associated with loop conductor 782. As a result, any adverse affect on a magnetic field adjacent to and associated with loop conductor 782 caused by conductive component 784 may be limited.

It is noted that, a wireless receive antenna may be integrated into electronic device 780 in a manner wherein loop conductor 782 of the wireless receive antenna is separated from conductive component 784 a sufficient distance so as to prevent an undamped quality factor of the wireless receive antenna from degrading more than a factor of about four upon integration thereof. Stated another way, an undamped quality factor of a wireless receive antenna should not be more than substantially four times greater than a quality factor of wireless receive antenna upon integration into electronic device 780.

FIG. 15 illustrates a flowchart of a method, in accordance with an exemplary embodiment. Method 700 for is supported by the various structures described herein. Method 700 includes a step 702 of integrating at least one wireless receive antenna into an electronic device. Method 700 further includes a step 704 of spacing a loop conductor of the at least one antenna from each conductive component within the electronic device.

FIG. 15 illustrates a flowchart of another method, in accordance with an exemplary embodiment. Method 705 for is supported by the various structures described herein. Method 705 includes a step 706 of receiving wireless power in at least one receive antenna integrated within an electronic device and having a loop conductor spaced from each conductive component within the electronic device. Method 705 further includes a step 708 of transferring power from the at least one receive antenna to at least one chargeable battery coupled thereto.

FIGS. 17A and 17B illustrate a single-loop conductor 650 of a wireless receive antenna configured for integration within an electronic device, according to an exemplary embodiment. Single-loop conductor 650 may comprise a wire or a ribbon 652, such as, for example only, a copper wire or a copper ribbon. According to one exemplary embodiment, ribbon 652 may comprise a copper ribbon having a silver plating. Further, as illustrated in FIG. 17B, single-loop conductor 650 includes a capacitor 654 and terminals 656. With reference to FIG. 17A, as non-limiting examples, single-loop conductor 650 may have a width A of about 44.0 millimeters, a height B of about 89.0 millimeters, and ribbon 652 may have a width C of about 3.0 millimeters. Further, single-loop conductor 650 may having a spacing F between the ends of ribbon 652, which may be, for example only, about 1.0 millimeter. Spacing F may be configured for placement of a capacitor, such as capacitor 654 as illustrated in FIG. 17A.

Figure 18B:
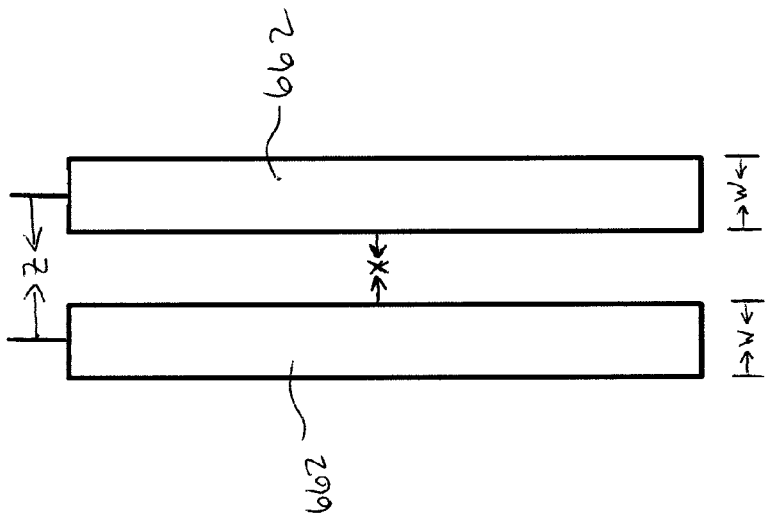
FIGS. 18A and 18B depict a multi-loop conductor receive antenna, according to an exemplary embodiment.
Figure 18A:
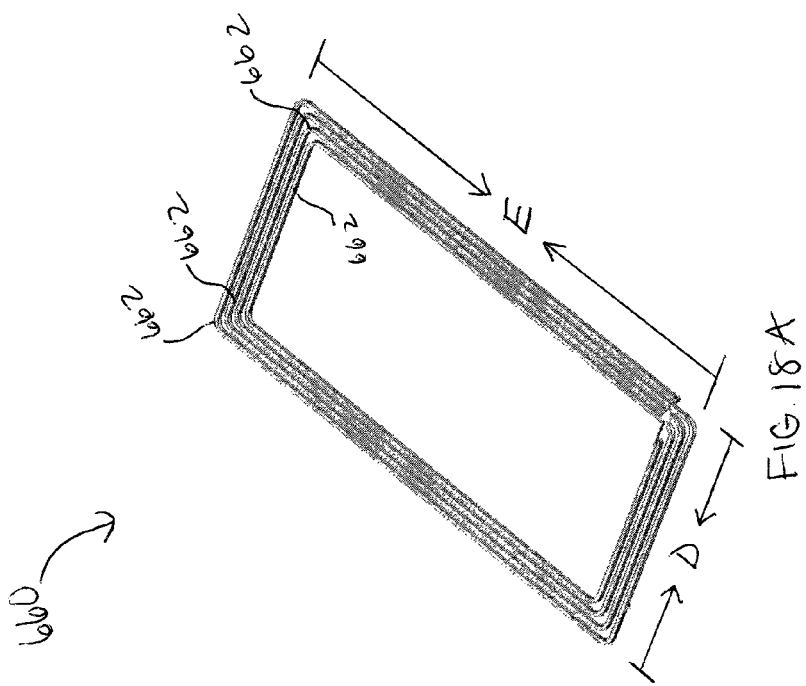

FIG. 18A illustrates a multi-loop conductor 660 of a wireless receive antenna configured for integration within an electronic device, in accordance with an exemplary embodiment. As illustrated, multi-loop conductor 660 may comprise a plurality of wires or ribbons 662, each of which may comprise, for example only, copper. Furthermore, as non-limiting examples, multi-loop conductor 660 may have a width D of about 47 millimeters and a height E of about 89 millimeters. Additionally, as illustrated in FIG. 18B, each wire 662 may have a width W, wires 662 may be separated by a distance X, and adjacent wires 662 may have a center-to-center spacing Z. According to "rules of thumb," distance X may be substantially equal to width W and center-to-center spacing Z may be substantially twice the value of distance X. For example only, width W and distance X may each be about 0.8 millimeters. Furthermore, in this example, center-to-center spacing Z may be about 1.6 millimeters.

Those of skill in the art would understand that control information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Those of skill would further appreciate that the various illustrative logical blocks, modules, circuits, and algorithm steps described in connection with the embodiments disclosed herein may be implemented as electronic hardware, and controlled by computer software, or combinations of both. To clearly illustrate this interchangeability of hardware and software, various illustrative components, blocks, modules, circuits, and steps have been described above generally in terms of their functionality. Whether such functionality is implemented and controlled as hardware or software depends upon the particular application and design constraints imposed on the overall system. Skilled artisans may implement the described functionality in varying ways for each particular application, but such implementation decisions should not be interpreted as causing a departure from the scope of the exemplary embodiments of the invention.

The various illustrative logical blocks, modules, and circuits described in connection with the embodiments disclosed herein may be controlled with a general purpose processor, a Digital Signal Processor (DSP), an Application Specific Integrated Circuit (ASIC), a Field Programmable Gate Array (FPGA) or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The control steps of a method or algorithm described in connection with the embodiments disclosed herein may be embodied directly in hardware, in a software module executed by a processor, or in a combination of the two. A software module may reside in Random Access Memory (RAM), flash memory, Read Only Memory (ROM), Electrically Programmable ROM (EPROM), Electrically Erasable Programmable ROM (EEPROM), registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

In one or more exemplary embodiments, the control functions described may be implemented in hardware, software, firmware, or any combination thereof. If implemented in software, the functions may be stored on or transmitted over as one or more instructions or code on a computer-readable medium. Computer-readable media includes both computer storage media and communication media including any medium that facilitates transfer of a computer program from one place to another. A storage media may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and blu-ray disc where disks usually reproduce data magnetically, while discs reproduce data optically with lasers. Combinations of the above should also be included within the scope of computer-readable media.

The previous description of the disclosed exemplary embodiments is provided to enable any person skilled in the art to make or use the present invention. Various modifications to these exemplary embodiments will be readily apparent to those skilled in the art, and the generic principles defined herein may be applied to other embodiments without departing from the spirit or scope of the invention. Thus, the present invention is not intended to be limited to the embodiments shown herein but is to be accorded the widest scope consistent with the principles and novel features disclosed herein.

What is claimed is:

1. An electronic device comprising:
a housing;
a plurality of conductive elements positioned within the housing; and
a receive antenna configured to receive power wirelessly from a transmit antenna separated from the receive antenna, the receive antenna positioned within the housing so that a quality factor of the receive antenna measured after positioning the receive antenna within the housing degrades by no more than a factor of about four as compared to the quality factor of the receive antenna measured in the absence of the housing and the plurality of conductive elements.

2. The electronic device of claim 1, wherein the receive antenna comprises one of a single-loop conductor or a multi-loop conductor.

3. The electronic device of claim 1, further comprising a chargeable battery positioned within the housing, wherein the receive antenna is configured to be spaced from the chargeable battery.

4. The electronic device of claim 1, further comprising a non-conductive element positioned within the housing, wherein the receive antenna is positioned adjacent the non-conductive element.

5. The electronic device of claim 1, wherein a clearance is formed between the receive antenna and each conductive element, and wherein the clearance comprises a vacant space, one or more non-conductive elements, or any combination thereof.

6. The electronic device of claim 1, wherein the quality factor of the receive antenna measured after positioning the receive antenna within the housing degrades by more than a factor of about two as compared to the quality factor of the receive antenna measured in the absence of the housing and the plurality of conductive elements.

7. The electronic device of claim 1, wherein the quality factor of the receive antenna measured after positioning the receive antenna within the housing degrades by more than a factor of about two but by no more than a factor of about four as compared to the quality factor of the receive antenna measured in the absence of the housing and the plurality of conductive elements.

8. The electronic device of claim 1, wherein the receive antenna is spaced from each conductive element by at least about 1 to 2 millimeters.

9. A device, comprising:
a housing;
a plurality of conductive elements positioned within the housing; and
a receive antenna configured to receive power wirelessly from a transmit antenna separated by a first distance from the receive antenna, the receive antenna comprising a loop conductor positioned at least a second distance away from each conductive element of the plurality of conductive elements, the receive antenna configured to form an electromagnetic field around the loop conductor, the second distance of an extent so that a quality factor of the receive antenna measured after positioning the loop conductor at least the second distance away from each conductive element within the housing degrades by no more than a factor of about four as compared to the quality factor of the receive antenna measured in the absence of the housing and the plurality of conductive elements.

10. The device of claim 9, further comprising a non-conductive element, wherein the loop conductor is configured to be positioned proximate the non-conductive element.

11. The device of claim 10, wherein the electromagnetic field exists within the non-conductive element.

12. The device of claim 9, wherein the loop conductor is separated from each conductive element by at least a portion of a clearance therebetween.

13. A method of integrating a receive antenna within an electronic device, comprising:
positioning the receive antenna within a housing comprising a plurality of conductive elements so that a quality factor of the receive antenna measured after positioning the receive antenna within the housing degrades by no more than a factor of about four as compared to the quality factor of the receive antenna measured in the absence of the housing and the plurality of conductive elements; and
forming an electromagnetic field around a loop conductor of the receive antenna.

14. The method of claim 13, wherein forming the electromagnetic field around the loop conductor comprises forming a clearance between the loop conductor and each conductive element.

15. The method of claim 13, wherein the quality factor of the receive antenna measured after positioning the receive antenna within the housing degrades by more than a factor of about two as compared to the quality factor of the receive antenna measured in the absence of the housing and the plurality of conductive elements.

16. The method of claim 13, further comprising positioning a non-conductive element adjacent the loop conductor.

17. The method of claim 13, further comprising spacing the loop conductor from a chargeable battery by about 1 to 2 millimeters.

18. The method of claim 13, wherein forming the electromagnetic field around the loop conductor comprises forming the electromagnetic field entirely around the loop conductor.

19. A method of charging an electronic device, comprising:
separating a receive antenna from a transmit antenna;
receiving power in the receive antenna having a loop conductor separated from each conductive element of a plurality of conductive elements positioned within a housing thereby forming an electromagnetic field around the loop conductor, the receive antenna positioned within the housing so that a quality factor of the receive antenna measured after positioning the receive antenna within the housing degrades by no more than a factor of about four as compared to the quality factor of the receive antenna measured in the absence of the housing and the plurality of conductive elements; and
transferring power from the receive antenna to a chargeable battery coupled thereto.

20. The method of claim 19, wherein
the quality factor of the receive antenna measured after positioning the receive antenna within the housing degrades by more than a factor of about two as compared to the quality factor of the receive antenna measured in the absence of the housing and the plurality of conductive elements.

21. A device that facilitates charging an electronic device, the device comprising:
means for wirelessly receiving power, the wireless power receiving means separated from a transmit antenna and separated from each conductive element of a plurality of conductive elements positioned within a housing thereby forming an electromagnetic field around the wireless power receiving means, the wireless power receiving means positioned so that a quality factor of the wireless power receiving means measured after positioning the wireless power receiving means within the housing degrades by no more than a factor of about four as compared to the quality factor of the wireless power receiving means measured in the absence of the housing and the plurality of conductive elements; and
means for transferring power from the wireless power receiving means to a chargeable battery coupled thereto.

22. A system, comprising:
- a plurality of conductive elements positioned within a housing; and
- a receive antenna configured to wirelessly receive power from a transmit antenna separated from the receive antenna, the receive antenna positioned within the housing to form an electromagnetic field around a loop conductor of the receive antenna, the receive antenna positioned within the housing so that a quality factor of the receive antenna measured after positioning the receive antenna within the housing degrades by no more than a factor of about four as compared to the quality factor of the receive antenna measured in the absence of the housing and the plurality of conductive elements.

23. The system of claim 22, further comprising a non-conductive element positioned within the housing, wherein the loop conductor is positioned proximate the non-conductive element.

24. The system of claim 22, wherein the loop conductor is spaced about 1 to 2 millimeters from a conductive element closest thereto.

25. The system of claim 22, wherein the electromagnetic field is formed entirely around the loop conductor.

26. The system of claim 22, further comprising a receive circuitry connected to the receive antenna, the receive circuitry comprising an impedance match circuitry configured to match an impedance of the receive antenna to an impedance of the receive circuitry.

27. The electronic device of claim 1, wherein the receive antenna is positioned within the housing such that a planar portion of the receive antenna is at least a distance away from each conductive element of the plurality of conductive elements.

* * * * *